United States Patent
Yasuie et al.

(10) Patent No.: US 8,996,694 B2
(45) Date of Patent: Mar. 31, 2015

(54) COMPUTER-READABLE RECORDING MEDIUM, INFORMATION PROCESSING METHOD, AND INFORMATION PROCESSING APPARATUS

(71) Applicant: Fujitsu Limited, Kawasaki-shi, Kanagawa (JP)

(72) Inventors: Takeshi Yasuie, Kawasaki (JP); Taichi Sugiyama, Kawasaki (JP); Yuji Nomura, Kawasaki (JP)

(73) Assignee: Fijitsu Limited, Kawasaki (JP)

( * ) Notice: Subject to any disclaimer, the term of this patent is extended or adjusted under 35 U.S.C. 154(b) by 247 days.

(21) Appl. No.: 13/660,383

(22) Filed: Oct. 25, 2012

(65) Prior Publication Data

US 2013/0179564 A1     Jul. 11, 2013

(30) Foreign Application Priority Data

Jan. 6, 2012  (JP) .................................. 2012-001089

(51) Int. Cl.
*G06F 15/173*    (2006.01)
*H04L 29/06*    (2006.01)

(52) U.S. Cl.
CPC ...................................... *H04L 63/20* (2013.01)
USPC ........................................................ 709/224

(58) Field of Classification Search
USPC .......................................................... 709/224
See application file for complete search history.

(56) References Cited

U.S. PATENT DOCUMENTS

2008/0005793 A1 * 1/2008 Wenig et al. .................... 726/22

FOREIGN PATENT DOCUMENTS

JP         2010-81194        4/2010

* cited by examiner

*Primary Examiner* — Tu Nguyen
(74) *Attorney, Agent, or Firm* — Oblon, McClelland, Maier & Neustadt, L.L.P.

(57) ABSTRACT

A computer-readable recording medium having stored therein a program for causing a computer to execute a digital signature process, wherein the digital signature process includes distributing packets to machines based on session durations according to a communication of the packets in a given duration, and performing verification tests based on the packets distributed to the machines by each of the machines.

20 Claims, 21 Drawing Sheets

FIG. 5

| NUMBER | TIME | TRANSMISSION SOURCE | DESTINATION | PROTOCOL | DESTINATION PORT | SESSION ID | PACKET INFORMATION |
|---|---|---|---|---|---|---|---|
| 1 | 9:59:00 | A | S | TCP | 80 (HTTP) | atos | Get /login |
| 2 | 9:59:03 | S | A | TCP | 10001 | atos | HTTP /1.0 200 OK |
| 3 | 9:59:10 | A | S | TCP | 80 (HTTP) | atos | Post /purchase |
| 4 | 9:59:20 | B | S | TCP | 80 (HTTP) | btos | Get /login |
| 5 | 9:59:23 | S | B | TCP | 10001 | btos | HTTP /1.0 200 OK |
| 6 | 9:59:25 | S | A | TCP | 10001 | atos | HTTP /1.0 200 OK |
| 7 | 9:59:30 | A | S | TCP | 80 (HTTP) | atos | Get /login |
| 8 | 9:59:31 | S | A | TCP | 10001 | atos | HTTP /1.0 200 OK |
| 9 | 9:59:50 | B | S | TCP | 80 (HTTP) | btos | Post /purchase |
| 10 | 10:00:01 | C | S | TCP | 80 (HTTP) | ctos | Get /login |
| 11 | 10:00:04 | S | C | TCP | 15001 | ctos | HTTP /1.0 200 OK |
| 12 | 10:00:05 | S | B | TCP | 10001 | btos | HTTP /1.0 200 OK |
| 13 | 10:00:10 | C | S | TCP | 80 (HTTP) | ctos | Post /purchase |
| 14 | 10:00:25 | S | C | TCP | 15001 | ctos | HTTP /1.0 200 OK |
| 15 | 10:00:30 | B | S | TCP | 80 (HTTP) | btos | Get /login |
| 16 | 10:00:31 | S | B | TCP | 10001 | btos | HTTP /1.0 200 OK |
| 17 | 10:00:40 | C | S | TCP | 80 (HTTP) | ctos | Get /login |
| 18 | 10:00:41 | S | C | TCP | 15001 | ctos | HTTP /1.0 200 OK |

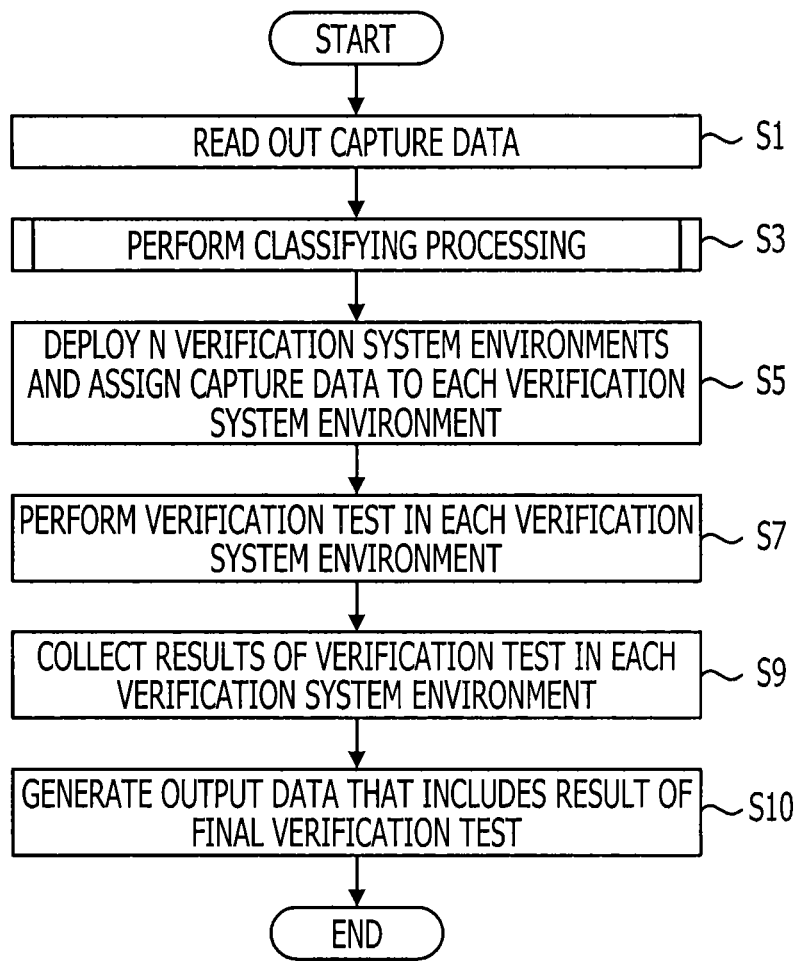

FIG. 12

| SESSION ID | START TIME | END TIME |
|---|---|---|
| atos | 9:59:00 | 9:59:31 |
| btos | 9:59:20 | 10:00:31 |
| ctos | 10:00:01 | 10:00:41 |

COMPUTER-READABLE RECORDING MEDIUM, INFORMATION PROCESSING METHOD, AND INFORMATION PROCESSING APPARATUS

CROSS-REFERENCE TO RELATED APPLICATIONS

This application is based upon and claims the benefit of priority of the prior Japanese Patent Application No. 2012-001089, filed on Jan. 6, 2012, the entire contents of which are incorporated herein by reference.

FIELD

The embodiments discussed herein are related to a computer-readable recording medium, an information processing method, and an information processing apparatus.

BACKGROUND

After operation for applying a patch to a server, updating firmware, changing the server from a physical server to a virtual server, or the like, a test is performed to verify whether the server operates as before the operation. The above-described test is called a verification test. It may take long to rigorously perform the verification test. Thus, there is a demand for a technique for performing the verification test in a short period of time.

According to the technique for performing the verification test, a control unit stores data (that is, capture data), which is obtained by adding a time stamp to reception data based on a real time clock, in a storage unit in a chronological order. A start time of a system time may be set to any time. When the start time is set, the system time is regularly updated based on a real time clock. When there is an instruction of simulation transmission, the data with the time stamp corresponding to the system time is sequentially transmitted to a low rank system. When a new start time is set in a direction where the system time is set forward, untransmitted data with the time stamp of a time that is older than the new start time is extracted and is then high-speed transmitted at short telegram message intervals. Due to this, retransmission is performed at substantially the same timing as actual transmission intervals, and a reproduction test of failure occurrence is performed. Further, as for part that is not typically reproduced conscientiously, the high-speed transmission is performed at the short telegram message intervals to effectively perform simulation.

If the transmission interval of the data is shorter than the actual transmission interval, the load of the system that performs the verification test increases. The part in which the transmission interval may be shortened is limited.

Japanese Laid-open Patent Publication No. 2010-81194

SUMMARY

According to an aspect of the invention, a computer-readable recording medium having stored therein a program for causing a computer to execute a digital signature process, wherein the digital signature process includes distributing packets to machines based on session durations according to a communication of the packets in a given duration, and performing verification tests based on the packets distributed to the machines by each of the machines.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 illustrates an example of data stored in a practical use system data storage unit;
FIG. 6 illustrates a processing flow of main processing according to the first embodiment;
FIG. 12 illustrates an example of data stored in a session data storage unit.

DESCRIPTION OF THE EMBODIMENTS

Figure 1:
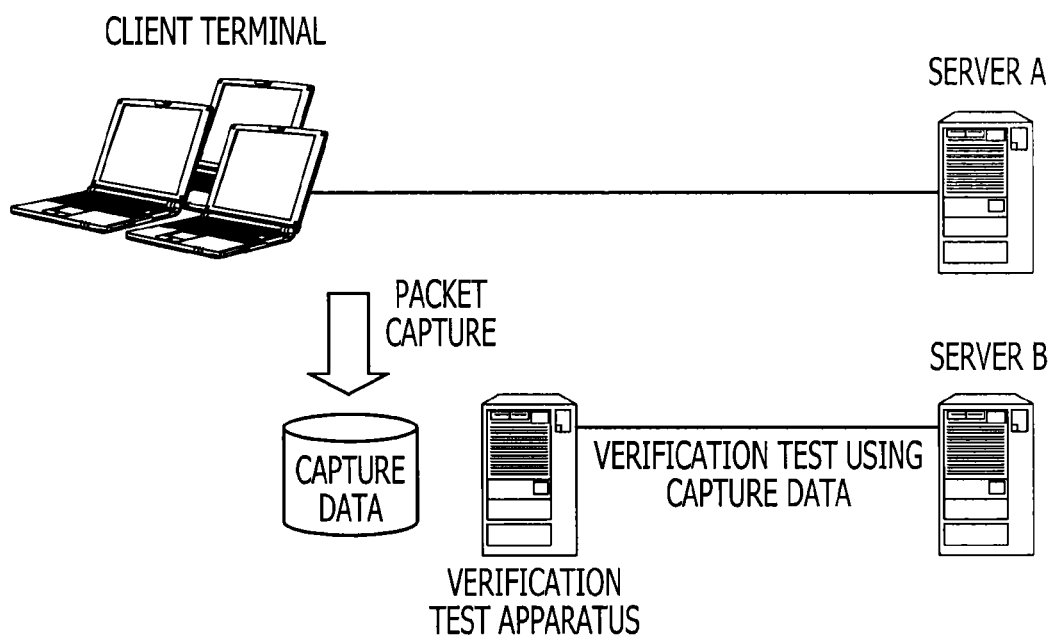
FIG. 1 illustrates a verification test using capture data.

With reference to FIG. 1, a verification test using capture data will be described below. In the system illustrated in the upper part of FIG. 1, a client terminal is coupled to a server A, and packets are exchanged between the client terminal and the server A. This system is a web system, for example. The client terminal is coupled to the server A through a network such as the Internet, which is not illustrated. Here, a server B is newly provided, and the verification test is assumed to be performed on the server B.

According to the verification test using the capture data, the packets exchanged between the client terminal and the server A are captured and then stored with a time the packets were captured. As illustrated in the lower part of FIG. 1, a system has a configuration in which a verification test apparatus is coupled to the server B that is newly provided. After performing prescribed conversion (for example, conversion of a transmission source and a destination address) on the packet included in the stored capture data, the verification test apparatus transmits the packet to the server B. The server B performs processing according to a request packet received from the verification test apparatus and transmits a response packet that includes a processing result to the verification test apparatus. By capturing, storing, and comparing the packet exchanged between the test verification apparatus and the server B to the capture data obtained from the system illustrated in the upper part of FIG. 1, the server B is checked to be normally operating.

Figure 2:
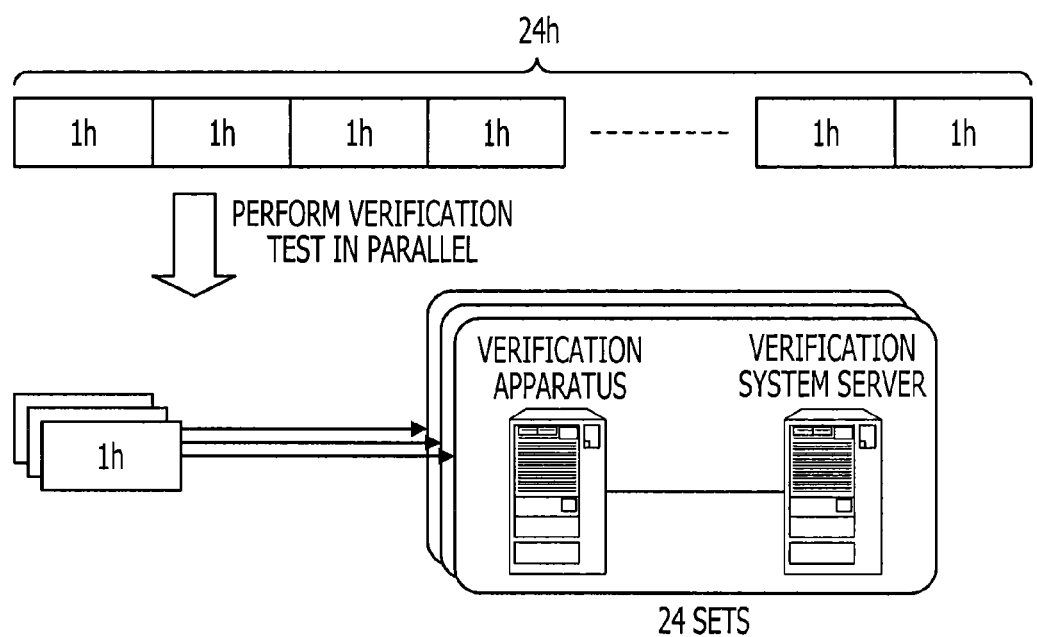
FIG. 2 illustrates an example of a case where the verification test is performed in parallel.

For example, if the capture data for one day is obtained from the system illustrated in the upper part of FIG. 1, it takes one day to simply perform the verification test. As illustrated in FIG. 2, the verification test may be performed in a plurality of systems in parallel. In the example illustrated in FIG. 2, 24 hours are divided into 24 time blocks where each time block has a 1 hour length. And 24 sets of system that perform the verification test are provided, and the capture data corresponding to one of the time blocks is assigned to one of the systems. In this manner, the verification test is completed in 1 hour.

Figure 3:
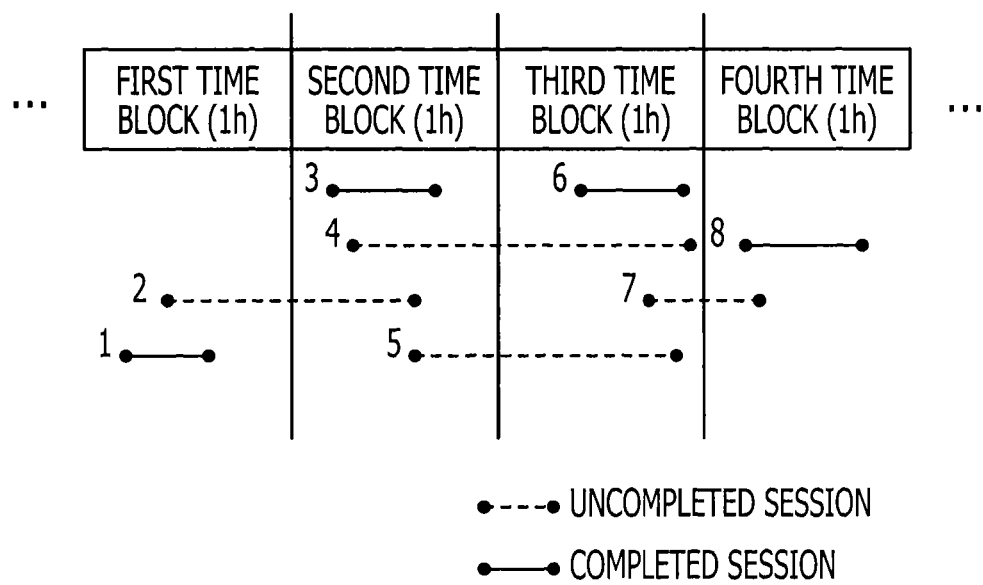
FIG. 3 illustrates a problem that occurs when the verification test is performed in parallel.

In the example illustrated in FIG. 3, 4 hours are divided into time blocks 1 to 4 where each time block has a 1 hour length. A line attached with circles at the edges thereof indicates a session that is established by a packet included in the capture data. The circle at the left edge of the line indicates the start of the session, and the circle at the right edge of the line indicates the end of the session.

In the example illustrated in FIG. 3, the packets in the sessions 2, 4, 5, and 7 are assigned to a plurality of time blocks. That is, the packets in the session 2 are assigned to a time block 1 and a time block 2, the packets in the sessions 4 and 5 are assigned to the time block 2 and a time block 3, and the packets in the session 7 are assigned to the time block 3 and a time block 4. In this case, as with the part assigned to the time block 4 in the session 7, for example, the part assigned to the following time blocks does not include the start of the session. Due to this, the session may not be established. Due to this, the sessions 2, 4, 5, and 7 are not reproduced from the start to the end in the verification test. The sessions 1, 3, 6, and 8 are reproduced from the start to the end.

A method for performing each session, included in the capture data in one of the systems, thoroughly from the start to the end even if the verification test is performed in parallel will be described below.

Figure 4:
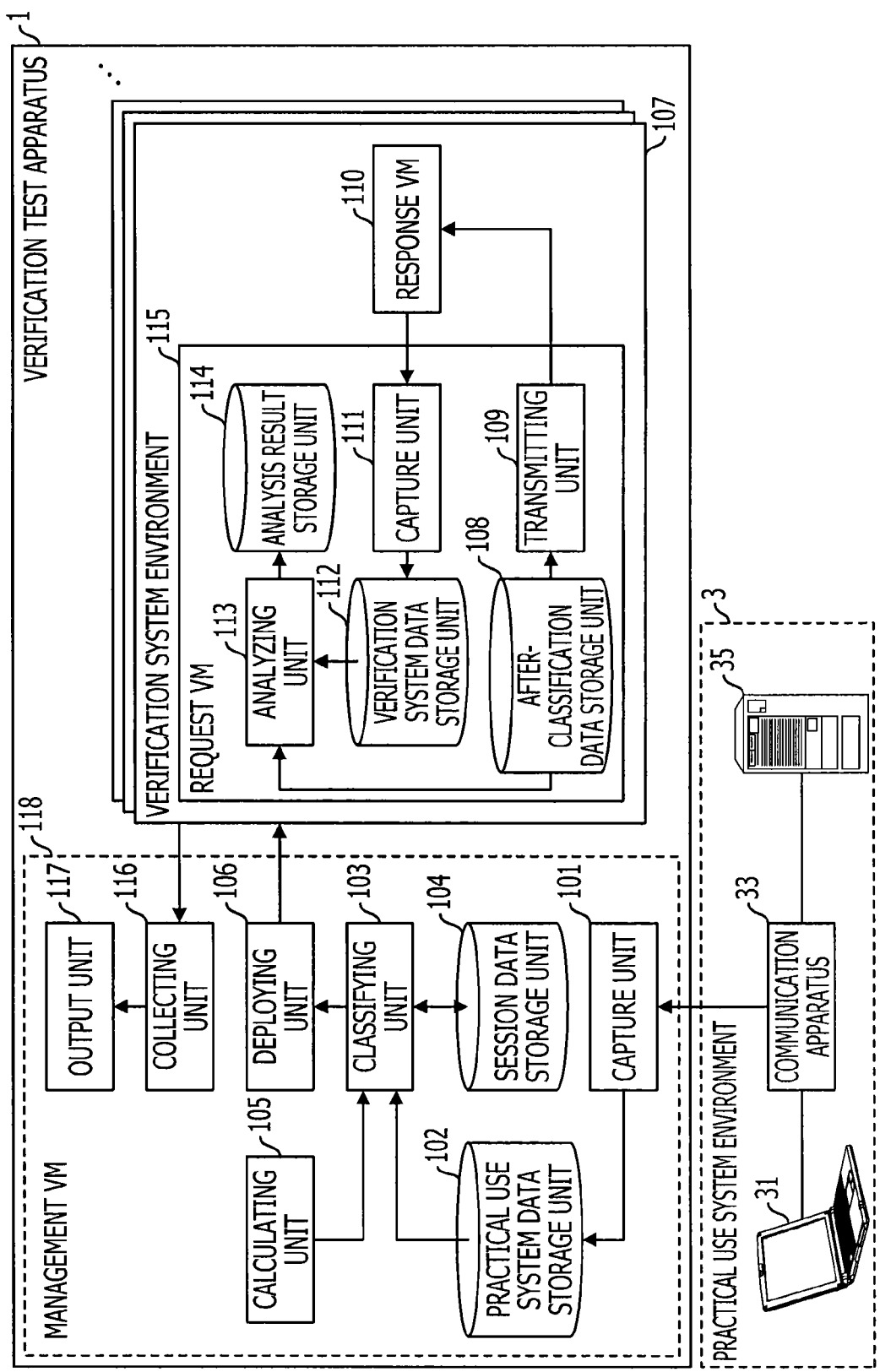
FIG. 4 illustrates a system overview according to a first embodiment.

FIG. 4 illustrates a system overview according to a first embodiment. In a system according to the first embodiment, a verification test apparatus 1 is coupled to a communication apparatus 33 in a practical use system environment 3. The communication apparatus 33 is a switch or a tap device, for example. The communication apparatus 33 transmits a packet to be exchanged between a client terminal 31 and a server 35 to the verification test apparatus 1 by port mirroring, for example. The verification test apparatus 1 uses the packet received from the communication apparatus 33 to perform the verification test.

The verification test apparatus 1 includes a management Virtual Machine (VM) 118 that has a capture unit 101, a practical use system data storage unit 102, a classifying unit 103, a session data storage unit 104, a calculating unit 105, a deploying unit 106, a collecting unit 116, and an output unit 117. In the verification test apparatus 1, a plurality of verification system environments 107 is deployed by the deploying unit 106.

The capture unit 101 obtains a packet from the communication apparatus 33 in the practical use system environment 3 and then stores the data and the obtainment time of the obtained packet in the practical use system data storage unit 102. The classifying unit 103 uses the data stored in the practical use system data storage unit 102 and the data stored in the session data storage unit 104 to perform classifying processing described below and then outputs a processing result to the deploying unit 106. The calculating unit 105 performs processing to calculate the number of the verification system environments to be deployed and then outputs the processing result to the classifying unit 103. According to a prescribed definition, the deploying unit 106 deploys the verification system environments 107 by using a hardware resource of the verification test apparatus 1. The collecting unit 116 collects the results of the verification test from the verification system environments, generates display data that includes the results of the final verification test based on the collected results of the verification test, and outputs the display data to the output unit 117. The output unit 117 displays the display data in a display device.

In the verification system environment 107, a request VM (Virtual Machine) 115 as a virtual machine and a response VM 110 as a virtual machine are realized. An after-classification data storage unit 108 stores the capture data that is assigned by the deploying unit 106. A transmitting unit 109 uses the data of the packet stored in the after-classification data storage unit 108 to generate a request packet to be transmitted to the response VM 110 and then transmits the request packet to the response VM 110. For example, after converting IP addresses of the transmission source and destination, a sequence number of a Transmission Control Protocol (TCP), and information in a HyperText Transfer Protocol (HTTP) of a packet, the transmitting unit 109 transmits the packet to the response VM 110. The response VM 110, which is a virtual machine as a target of the verification test, performs processing according to the request packet from the transmitting unit 109 and then transmits the response packet that includes a processing result to a capture unit 111.

The capture unit 111 obtains the packet from the response VM 110 and then stores the packet in a verification system data storage unit 112. By using the data stored in the verification system data storage unit 112 and the data stored in the after-classification data storage unit 108, an analyzing unit 113 determines whether the packets are exchanged between the request VM 115 and the response VM 110 (request and response) without any problem. For example, the analyzing unit 113 determines whether the exchange of the packets between the request VM 115 and the response VM 110 in the similar manner of the exchange of the packets between the client terminal 31 and the server 35. The analyzing unit 113 stores data indicating "OK" or "NG" as the result of the verification test in an analysis result storage unit 114. The verification test is disclosed in Japanese Laid-open Patent Publication No. 2011-164755. The verification test is not the main part of the embodiments, so that further description is omitted.

FIG. 5 illustrates an example of the capture data stored in the practical use system data storage unit 102. In the example illustrated in FIG. 5, serial numbers, obtainment times of packets, information of transmission source (for example, an IP address of transmission source), information of destination (for example, an IP address of destination), information of communication protocols, information of destination ports, session IDs, and other information about the packet are stored. In the example illustrated in FIG. 5, the capture data includes at least information (for example, information about a session) about the packet and the obtainment time of the packet. A session ID is included in the information of Cookie of HTTP, for example. According to the first embodiment, the packet having information of "Get/login" indicates the start of a session, and the packet having information of "Get/ logout" indicates the end of the session.

Figure 7:
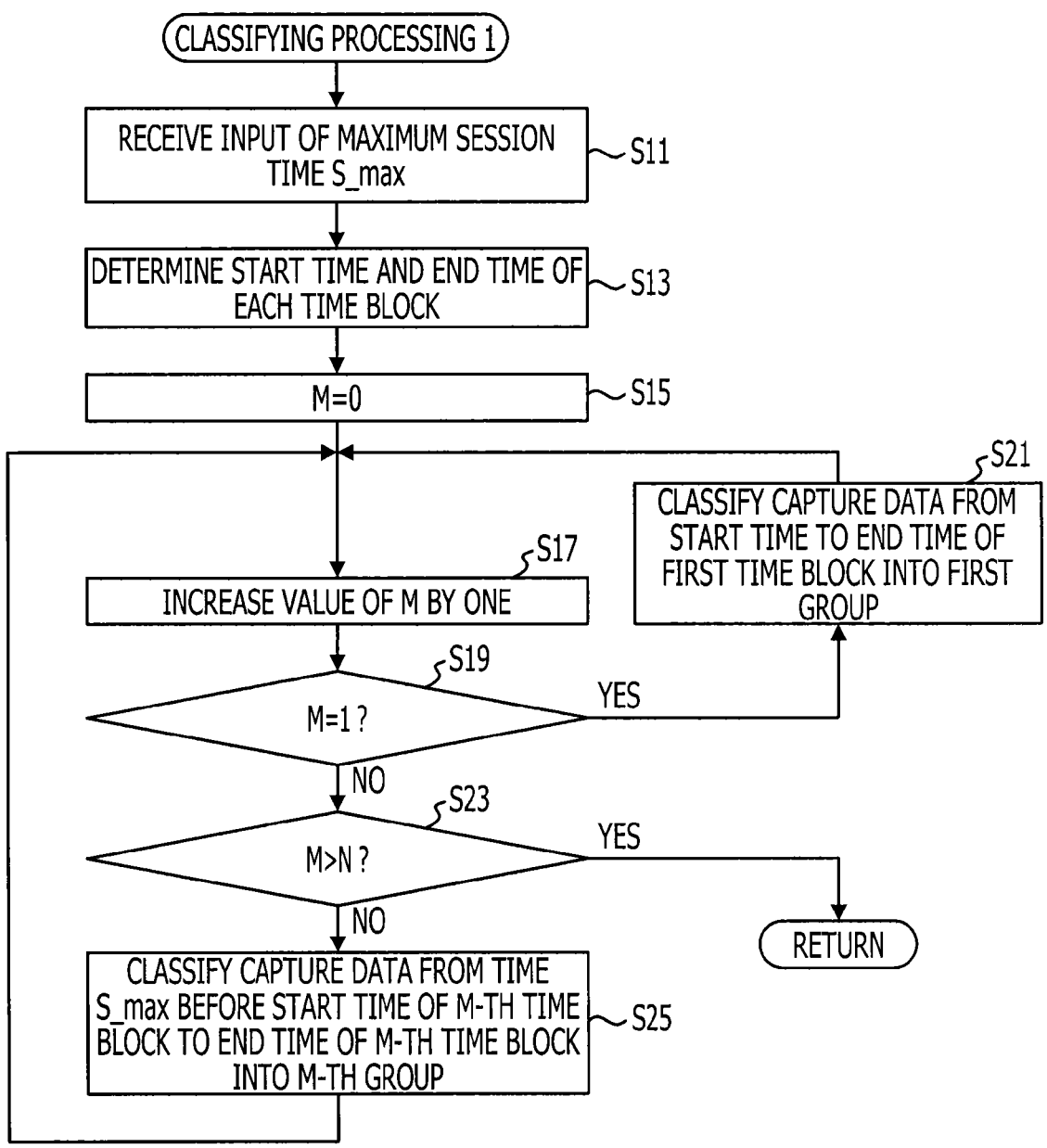
FIG. 7 illustrates a processing flow of classifying processing according to the first embodiment.
Figure 8:
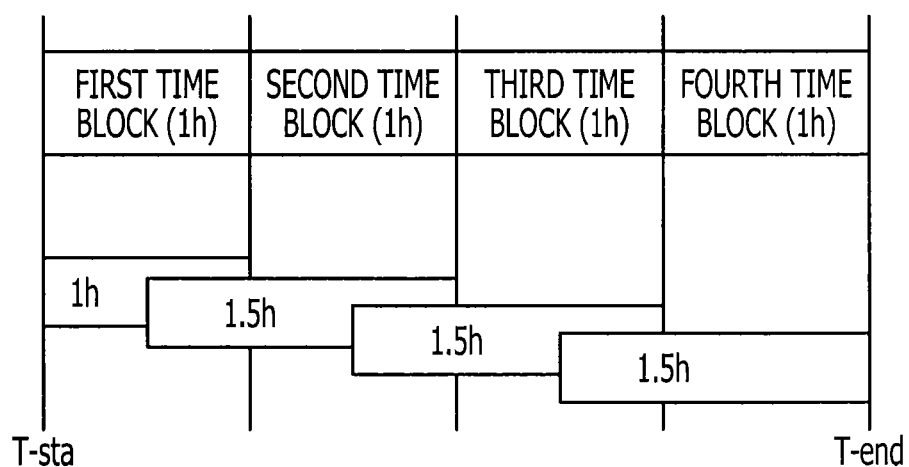
FIG. 8 illustrates the classifying processing according to the first embodiment.

With reference to FIGS. 6 to 8, the processing performed in the verification test apparatus 1 illustrated in FIG. 4 will be described below. The capture unit 101 in the verification test apparatus 1 previously obtains the capture data from a time T_sta to a time T_end from the practical use system environment 3 and then stores the captured data in the practical use system storage unit 102.

The classifying unit 103 in the verification test apparatus 1 reads out the capture data from the time T_sta to the time T_end from the practical use system data storage unit 102 (Operation S1 in FIG. 6). The classifying unit 103 performs the classifying processing (Operation S3). The classifying processing will be described below with reference to FIG. 7.

The classifying unit 103 receives an input of a maximum session time S_max from a user of the verification test apparatus 1 (Operation S11 in FIG. 7). The maximum session time S_max is a period of time of the maximum session that exists between the time T_sta and the time T_end. In Operation S11, although the input is received from the user, the data stored in the data storage unit or the like (not illustrated) also may be read out.

By calculating a length T_div of one time block using T_all/N (N is a natural time that is two or more), the classifying unit 103 specifies the start time and the end time of each time block (Operation S13). Here, T_all indicates duration from the time T_sta until the time T_end. The base time T_div indicates a length of one time block in a case where T_all is divided into N time blocks with the similar lengths.

The classifying unit 103 sets a variable M (M is a natural number satisfying 1<=M<=N) used to count the number of time blocks to M=0 (Operation S15). The classifying unit 103 increases the value of the variable M by one (Operation S17).

The classifying unit 103 determines whether the variable M satisfies M=1 (Operation S19). If the variable M satisfies M=1 (YES in Operation S19), the classifying unit 103 classifies the capture data from the start time to the end time of the first time block and then stores the capture data in a memory device (Operation S21). The process goes back to Operation S17.

If the variable M does not satisfy M=1 (NO in Operation S19), the classifying unit 103 determines whether the variable M satisfies M>N (Operation S23). If the variable M does not satisfy M>N (NO in Operation S23), the classifying unit 103 classifies the capture data from the time S_max before the start time of the M-th time block to the end time of the M-th time block into the M-th group and then stores the capture data in the memory device (Operation S25). The process goes back to the processing in Operation S17.

In Operation S23, if the variable M satisfies M>N (YES in Operation S23), the processing for the first time block to the N-th time block is completed. Thus, the process goes back to the original processing.

With reference to FIG. 8, the above-described classifying processing will be described in detail. FIG. 8 illustrates the result of the above-described classifying processing in a case of N=4, T_all=4 (time), and S_max=0.5 (time). According to the above-described classifying processing, the capture data from the start time to the end time of the first time block is classified into the first group. The capture data from the time 0.5 hours before the start time of the second time block to the end time of the second time block is classified into the second group. The capture data from the start time 0.5 hours before the start time of the third time block to the end time of the third time block is classified into the third group. The capture data from the start time 0.5 hours before the start time of the fourth time block to the end time of the fourth time block is classified into the fourth group.

The session that ends in the first time block is reproduced when the verification test is performed on the capture data corresponding to the first group. The session that ends in the second time block is reproduced when the verification test is performed on the capture data corresponding to the second group. The session that ends in the third time block is reproduced when the verification test is performed on the capture data corresponding to the third group. The session that ends in the fourth time block is reproduced when the verification test is performed on the capture data corresponding to the fourth group. According to the above-described classifying processing, the session from the time T_sta to the time T_end is thoroughly reproduced.

According to the above-described classifying processing, the capture data may be classified into groups for an uncompleted session without the start of the session. Such capture data may be removed.

As illustrated in FIG. 6, the deploying unit 106 deploys N verification system environments and then assigns the capture data to each of the verification system environments (Operation S5). In Operation S5, the capture data corresponding to one group for the N verification system environments. The capture data is stored in the after-classification data storage unit 108.

The request VM 115 and the response VM 110 in each of the verification system environments performs the verification test and then stores the result of the verification test in the analysis result storage unit 114 (Operation S7). For example, the data indicating "OK" or "NG" as the result of the verification test is stored in the analysis result storage unit 114. The specific contents of the verification test are described above.

The collecting unit 116 collects the results of the verification test in each of the verification system environments (Operation S9). Based on the result of the verification test in each of the verification system environments, the collecting unit 116 generates output data that includes a result of the final verification test (Operation S10) and then outputs the output data to the output unit 117. The output unit 117 displays output data in a display device. The process ends.

In Operation S11, for example, if all of the results of the verification test collected from each of the verification system environments indicate "OK," the result of the final verification test is "OK." If one of the results of the verification test indicates "NG," the result of the final verification test is "NG." However, the embodiment is not limited to the above-described method.

According to the above-described processing, compared to the case where the verification test is performed in parallel, an uncompleted session is prevented from being generated, and the session is reproduced more conscientiously. Thus, the verification test is properly performed. The maximum session time S_max is used, and the duration of the session is not typically analyzed. Thus, the embodying is easy. The start time (and the end time) of the capture data assigned to each of the groups is regularly determined. Due to this, when the capture data is backed up at a time of starting the verification test, the backup is easily performed. The duration from the start time until the end time of the capture data is similar to each other in all the groups, so that the time desired for the verification test is easily estimated.

In each of the verification system environments, the verification test is performed with the load that is substantially the same as the load of the case where the verification test is not performed in parallel.

According to a second embodiment, deformation examples according to the first embodiment will be described with reference to FIG. 9 and FIG. 10.

Figure 9:
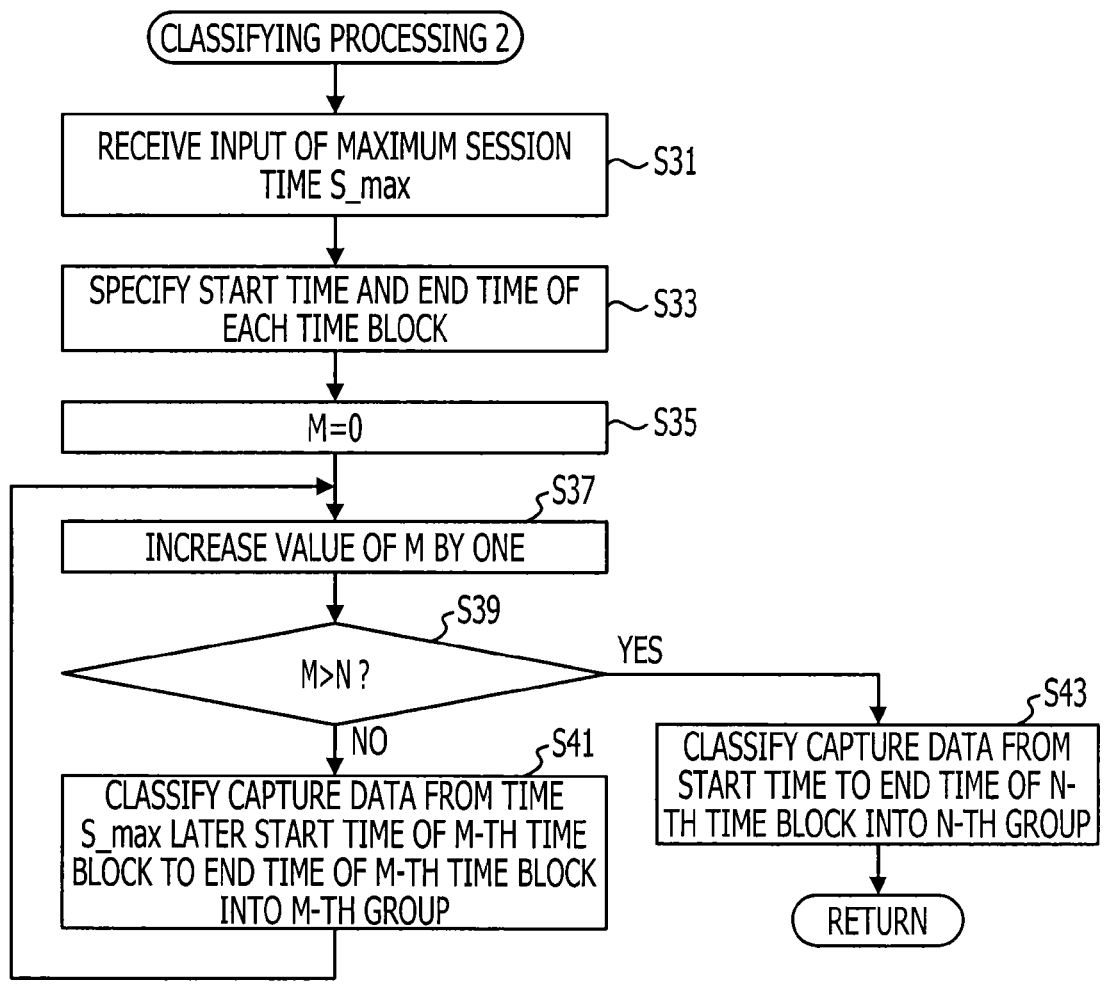
FIG. 9 illustrates a processing flow of classifying processing according to a second embodiment.

FIG. 9 illustrates a processing flow of classifying processing according to the second embodiment. The processing from Operation S31 to Operation S37 is similar to the processing from Operation S11 to Operation S17, so that description thereof is omitted.

In Operation S39, the classifying unit 103 determines whether the variable M satisfies M=N (Operation S39 in FIG. 9). If the variable M does not satisfy M=N (NO in Operation S39), the classifying unit 103 classifies the capture data from the start time of the M-th time block to the time S_max before the end time of the M-th time block (Operation S41). The process goes to Operation S37.

If the variable M satisfies M=N (YES in Operation S39), the classifying unit 103 classifies the capture data from the start time to the end time of the N-th time block into the N-th group (Operation S43). The processing for the first time block to the N-th time block is completed, so that the process goes back to the original processing.

Figure 10:
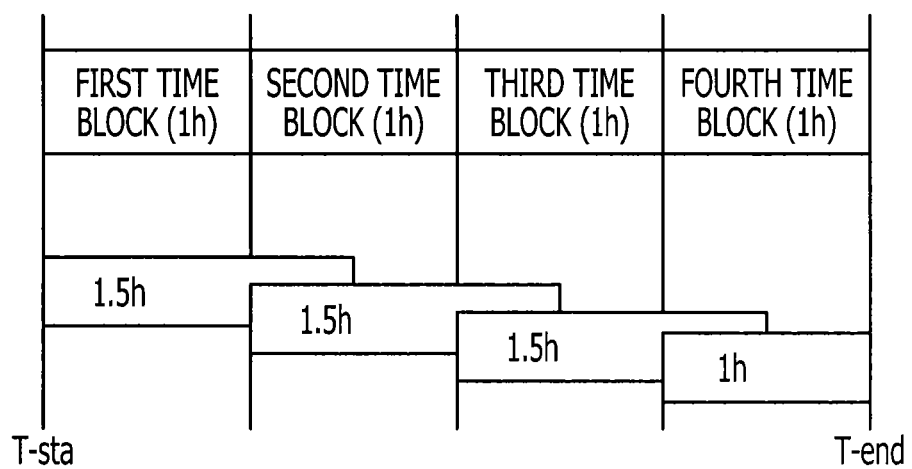
FIG. 10 illustrates the classifying processing according to the second embodiment.

With reference to FIG. 10, the concept of the above-described classifying processing will be described in detail. As with FIG. 8, FIG. 10 illustrates a result of a case where the above-described classifying processing is performed in a case of N=4, T_all=4 (time), and S_max=0.5 (time). According to the above-described classifying processing, the capture data from the start time of the first time block to the time 0.5 hours before the end time of the first time block is classified into the first group. The capture data from the start time of the second time block to the time 0.5 hours before the end time of the second time block is classified into the second group. The capture data from the start time of the third time block to the time 0.5 hours before the end time of the third time block is classified into the third group. The capture data from the start time to the end time of the fourth time block is classified into the fourth group.

The session starting in the first time block is reproduced when the verification test is performed on the capture data corresponding to the first group. The session starting in the second time block is reproduced when the verification test is performed on the capture data corresponding to the second group. The session starting in the third time block is reproduced when the verification test is performed on the capture data corresponding to the third group. The session starting in the fourth time block is reproduced when the verification test is performed on the capture data corresponding to the fourth group. According to the above-described classifying processing, the session from the time T_sta to the time T_end is thoroughly reproduced.

According to the above-described classifying processing, the capture data for the uncompleted session without the start of the session may be classified into the groups. Such capture data may be removed.

If the processing according to the second embodiment is performed, the effect equivalent to the first embodiment is achieved.

According to a third embodiment, other examples of the classifying processing will be described with reference to FIGS. 11 to 13.

Figure 11:
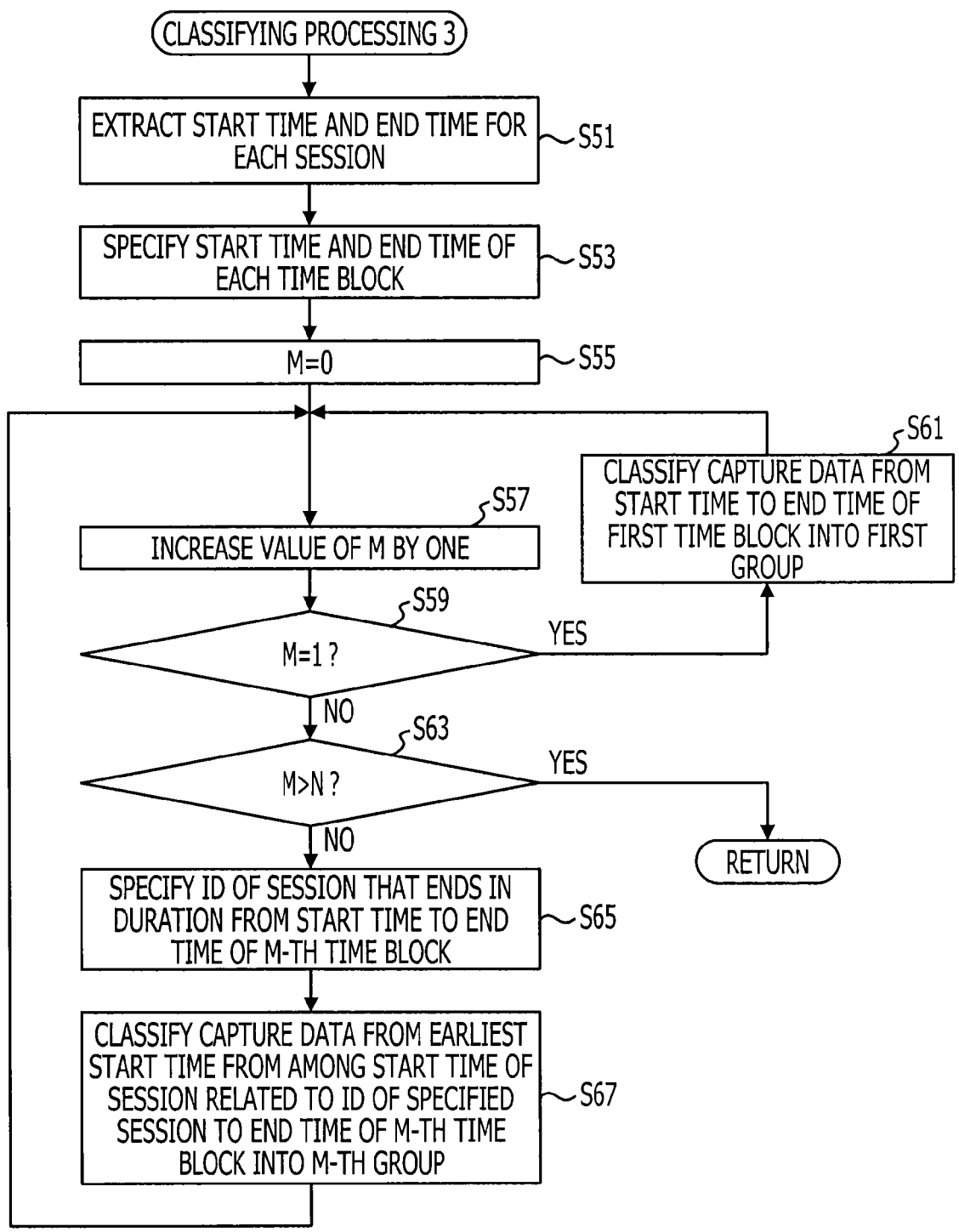
FIG. 11 illustrates a processing flow of classifying processing according to a third embodiment.

FIG. 11 illustrates a processing flow of the classifying processing according to the third embodiment. A capture unit 110 in the verification test apparatus 1 previously obtains the capture data from the time T_sta to the time T_end and then stores the capture data in the practical use system data storage unit 102.

The classifying unit 103 extracts the start time and the end time for each session from the capture data read out in Operation S1 and then stores the start time and the end time in the session data storage unit 104 (Operation S51 in FIG. 11).

FIG. 12 illustrates an example of data stored in the session data storage unit 104. In the example illustrated in FIG. 12, a session ID, a start time, and an end time are stored. As described above, according to the third embodiment, the packet having the information of "Get/login" is a packet indicating the start of the session, and the packet having the information of "Get/logout" is a packet indicating the end of the session.

The classifying unit 103 specifies the start time and the end time of each of the time blocks by calculating the length T_div of one time block with T_all/N (N is a natural number that is two or more) (Operation S53).

The classifying unit 103 sets the variable M (M is a natural number satisfying 1<=M<=N) used to count the number of time blocks to M=0 (Operation S55). The classifying unit 103 increases the value of the variable M by one (Operation S57).

The classifying unit 103 determines whether the variable M satisfies M=1 (Operation S59). If the variable M satisfies M=1 (YES in Operation S59), the classifying unit 103 classifies the capture date from the start time to the end time of the first time block and then stores the capture data in the memory device (Operation S61). That is, the classifying unit 103 classifies the captured data corresponding to the first time block into the first group. The process goes back to the processing in Operation S57.

If the variable M does not satisfy M=1 (NO in Operation S59), the classifying unit 103 determines whether the variable M satisfies M>N (Operation S63). If the variable M does not satisfy M>N (NO in Operation S63), the classifying unit 103 specifies, from the session data storage unit 104, the ID of the session that ends in the duration from the start time until the end time of the M-th time block (Operation S65). In Operation S65, the packet having the information of "Get/logout" specifies a packet indicating the end of the session from the capture data and then specifies the session ID included in the capture data of the specified packet. According to the third embodiment, although the end of a session is premised to be identified, the end of the session may be difficult to be identified. Therefore, if the end of the session is not identified, the ID of the session may be specified if part of the session is performed within the above-described period of time.

The classifying unit 103 classifies the capture data from the earliest start time, among the start times of the session related to the ID of the session specified in Operation S65, to the end time of the M-th time block into the M-th group (Operation S67). The process goes back to the processing in Operation S57 to process the next variable M.

In Operation S63, if the variable M satisfies M>N (YES in Operation S63), the processing for the first time block to the N-th time block is completed, so that the process goes back to the original processing.

Figure 13:
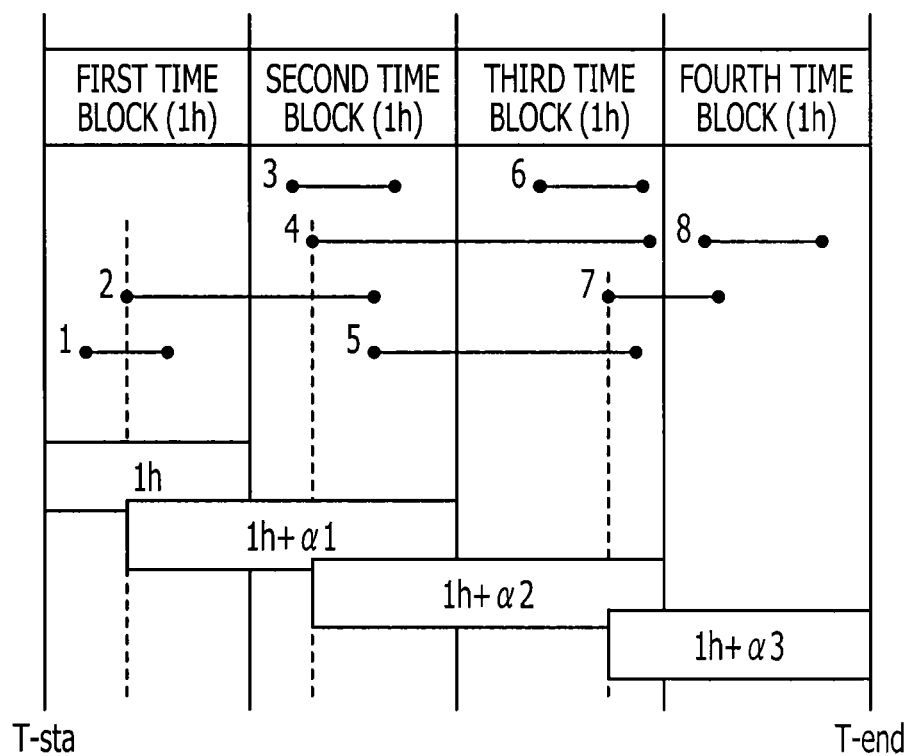
FIG. 13 illustrates the classifying processing according to the third embodiment.

With reference to FIG. 13, the concept of the above-described classifying processing will be described in detail below. FIG. 13 illustrates a result of a case where the above-described classifying processing is performed in a case of N=4 and T_all=4 (time). According to the above-described classifying processing, the capture data for the session that ends in the duration from the start time until the end time of the first time block is classified into the first group (the period of time lasts 1 hour). The capture data for the session that ends in the duration from the start time until the end time of the second time block is classified into the second group (the period of time lasts 1 hour+$\alpha_1$). The capture data for the session that ends in the duration from the start time until the end time of the third time block is classified into the third group (the period of time lasts 1 hour+$\alpha_2$). The capture data for the session that ends in the duration from the start time until the end time of the fourth time block is classified into the fourth group (the period of time last 1 hour+$\alpha_3$). Here, the periods of the time $\alpha_1$, the time $\alpha_2$, and the time $\alpha_3$ may not be similar to each other.

Therefore, a session 1, which ends in the first time block, is reproduced when the verification test is performed on the capture data corresponding to the first group. A session 2 and a session 3, which end in the second time block, are reproduced when the verification test is performed on the capture data corresponding to the second group. A session 4 and a session 5, which end in the third time block, are reproduced when the verification test is performed on the capture data corresponding to the third group. A session 7 and a session 8, which end in the fourth time block, are reproduced when the verification test is performed on the capture data corresponding to the fourth group. According to the above-described classifying processing, the session from the time T_sta to the time T_end is thoroughly reproduced.

According to the above-described classifying processing, the capture data for an uncompleted session without the start of the session may be classified into the groups. In the third group, for example, the session 2 and the session 3 are uncompleted sessions. The capture data of the uncompleted sessions may be removed.

According to the third embodiment, even if the time for the maximum session may not be estimated, the capture data is classified. Since the processing is performed based on rigorous calculation of the duration of the session, the period of time desired for the verification test may be shorter compared to the first and second embodiments. As described above, although the end of the session may be difficult to be identified compared to the start of the session, the third embodiment is applicable even if the end of the session may not be identified as described in Operation S65.

According to a fourth embodiment, with reference to FIGS. 14 and 15, deformation examples of the classifying processing according to the third embodiment will be described below.

Figure 14:
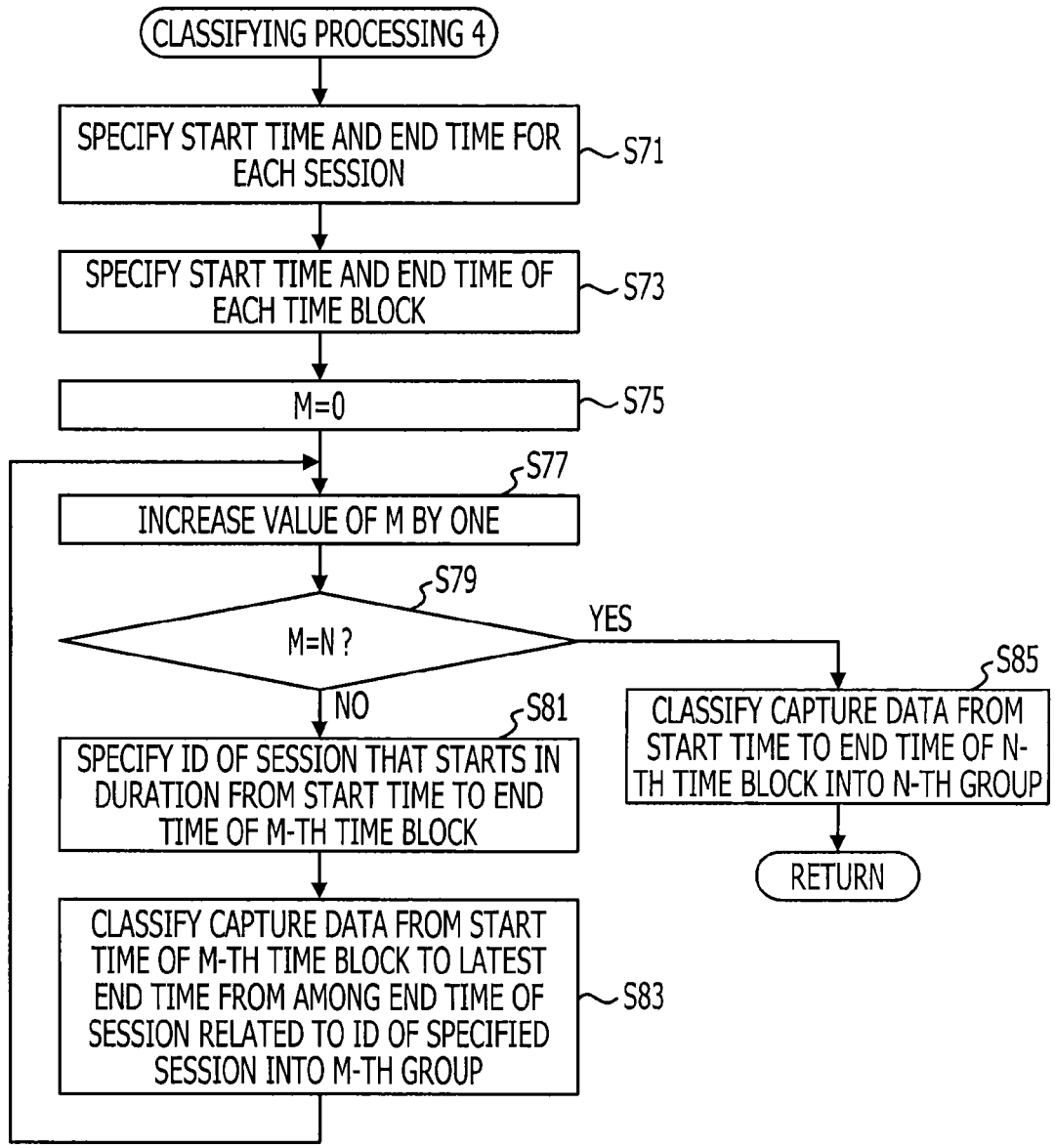
FIG. 14 illustrates a processing flow of classifying processing according to a fourth embodiment.

FIG. 14 illustrates a processing flow of classifying processing according to a fourth embodiment. The processing from Operation S71 to Operation S77 are equivalent to the processing from Operation S51 to Operation S57, so that description thereof is omitted.

In Operation S79, the classifying unit 103 determines whether the variable M satisfies M=N (Operation S79). If the variable M does not satisfy M=N (NO in Operation S79), the classifying unit 103 specifies, from the session data storage unit 104, the ID of the session that starts in the duration from the start time until the end time of the M-th time block (Operation S81).

The classifying unit 103 classifies the capture data from the start time of the M-th time block to the latest end time among the end times of the session related to the ID of the specified session into the M-th group (Operation S83). The process goes back to the processing in Operation S77 to process the next variable M.

If the variable M satisfies M=N (YES in Operation S79), the classifying unit 103 classifies the capture data from the start time to the end time of the N-th time block into the N-th group (Operation S85). The processing from the first time block to the N-th time block is completed, so that the process goes back to the original processing.

Figure 15:
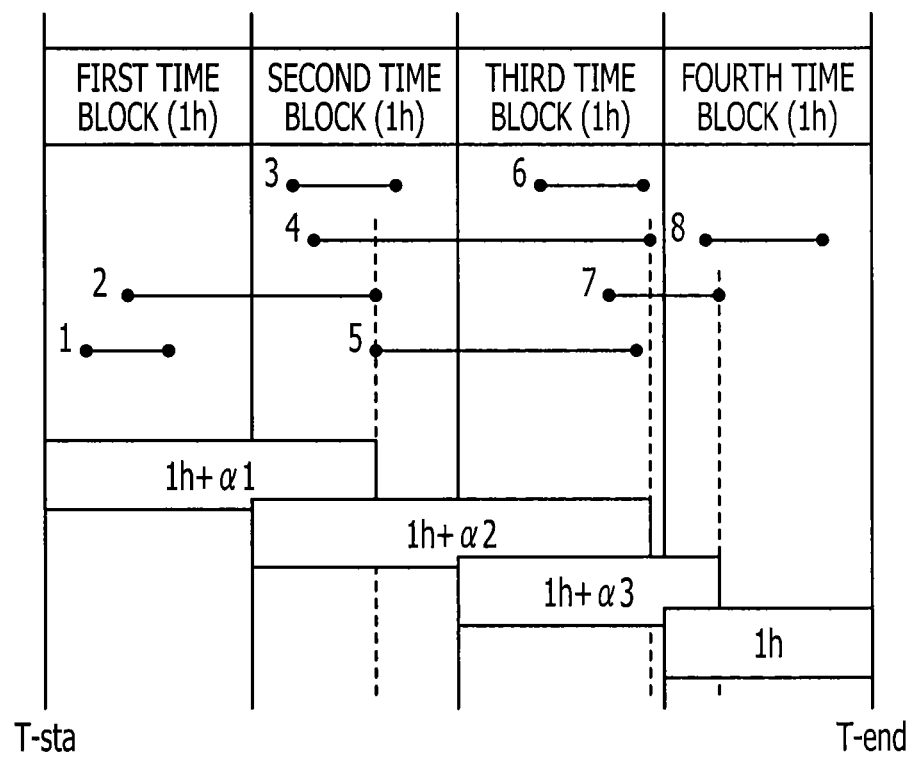
FIG. 15 illustrates the classifying processing according to the fourth embodiment.

With reference to FIG. 15, the concept of the above-described classifying processing will be described in detail below. FIG. 15 illustrates a result of the classifying processing described above in a case of N=4 and T_all=4 (time). According to the above-described classifying processing, the capture data for the session that starts in the duration from the start time until the end time of the first time block is classified into the first group (the period of time lasts 1 hour+$\alpha_1$). The capture data for the session that starts in the duration from the start time until the end time of the second time block is classified into the second group (the period of times lasts 1 hour+$\alpha_2$). The capture data for the session that starts in the duration from the start time until the end time of the third time block is classified into the third group (the period of times lasts 1 hour+$\alpha_3$). The capture data for the session that starts in the duration from the start time until the end time of the fourth time block is classified into the fourth group (the period of times lasts 1 hour). In this case, the periods of the time $\alpha_1$, the time $\alpha_2$, and the time $\alpha_3$ may not be similar to each other.

Therefore, the session 1 and the session 2, which start in the first time block, are reproduced when the verification test is performed on the capture data corresponding to the first group. The session 3, the session 4, and the session 5, which start in the second time block, are reproduced when the verification test is performed on the capture data corresponding to the second group. The session 6 and the session 7, which end in the third time block, are reproduced when the verification test is performed on the capture data corresponding to the third group. The session 8, which starts in the fourth time block, is reproduced when the verification test is performed on the capture data corresponding to the fourth group. According to the above-described classifying processing, the session from the time T_sta to the time T_end is thoroughly reproduced.

According to the above-described classifying processing, the capture data for the uncompleted session without the start of the session may not be classified in the groups. For example, in the third group, the session 4 and the session 5 are uncompleted session. The capture data of the uncompleted sessions may be removed.

According to the fourth embodiment, even if the time for the maximum session may not be estimated, the capture data is classified. Since the processing is performed based on rigorous calculation of the duration of the session, the period of time desired for the verification test may be shorter compared to the first and second embodiments. The start time of the capture data that is assigned to each of the groups is regularly determined. Due to this, when the capture data is backed up at a time of starting the verification test, the backup is easily performed.

According to the fifth embodiment, other examples of the classifying processing will be described below with reference to FIG. 16.

Figure 16:
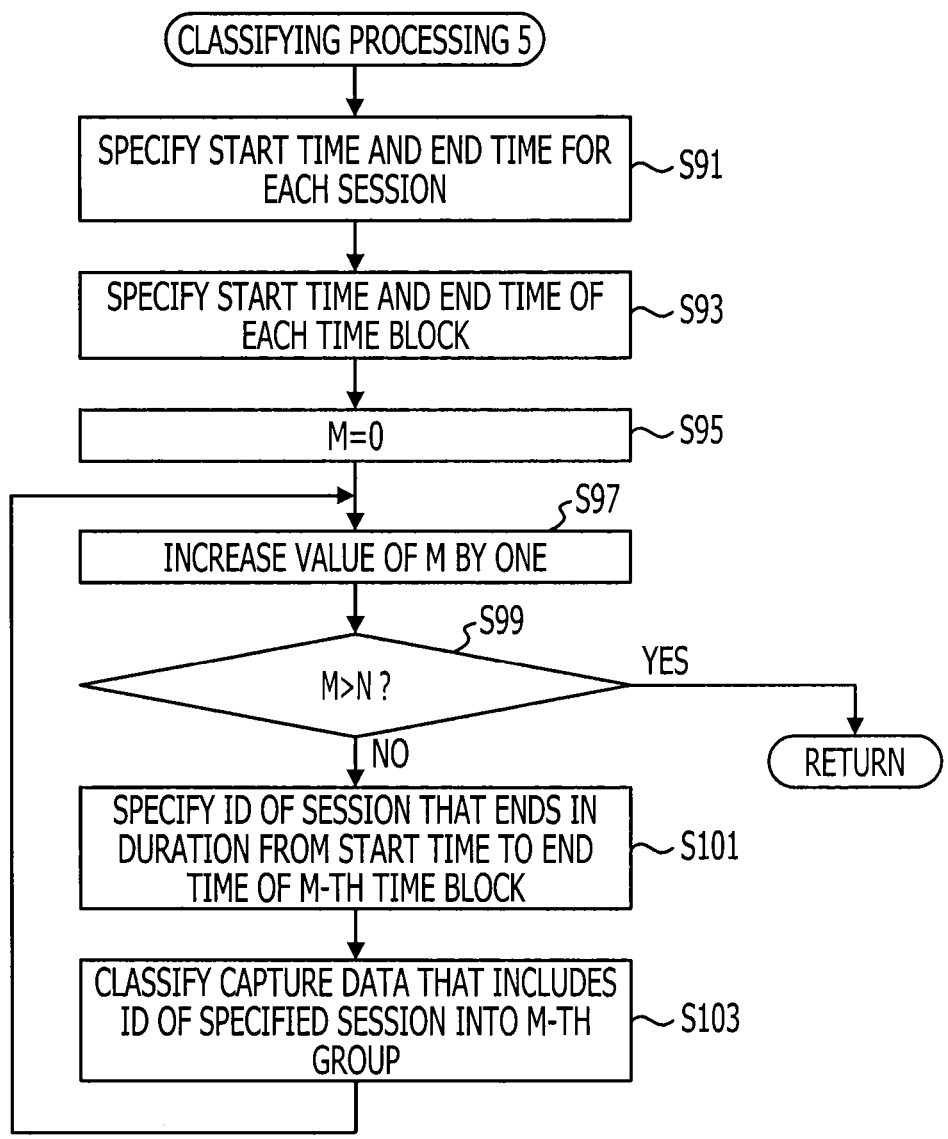
FIG. 16 illustrates a processing flow of classifying processing according to a fifth embodiment.

FIG. 16 illustrates a processing flow of the classifying processing according to the fifth embodiment. The capture unit 101 in the verification test apparatus 1 previously obtains the capture data from the time T_sta to the time T_end from the practical use system environment 3 and then stores the capture data in the practical use system data storage unit 102. The processing from Operation S91 to Operation S97 is equivalent to the processing from Operation S51 to Operation S57, so that description thereof is omitted.

The classifying unit 103 determines whether the variable M satisfies M>N (Operation S99). If the variable M does not satisfy M>N (NO in Operation S99), the classifying unit 103 specifies the ID of the session, which ends in the duration from the start time until the end time of the M-th time block, from the session data storage unit 104 (Operation S101). In Operation S101, the packet having the information of "Get/logout" specifies a packet indicating the end of the session from the capture data and then specifies the session ID included in the capture data of the specified packet. According to the fifth embodiment, although the end of the session is premised to be identified, the end of the session may be difficult to be identified. If the end of the session is not identified, the ID of the session may be specified while part of the session is performed in the duration from the start time until the end time of the M-th time block.

The classifying unit 103 classifies the capture data that includes the ID of the session specified in Operation S101 into the M-th group (Operation S103). The process goes back to Operation S97 to process the next variable M.

In Operation 99, if the variable M satisfies M≥N (YES in Operation S99), the processing from the first time block to the N-th time block is completed, so that the process goes back to the original processing.

If the above-described processing is performed, the session from the time T_sta to the time T_end is thoroughly reproduced while the capture data for the uncompleted session in each of the groups is not included.

According to a sixth embodiment, deformation examples of the classifying processing according to the fifth embodiment will be described below with reference to FIG. 17.

Figure 17:
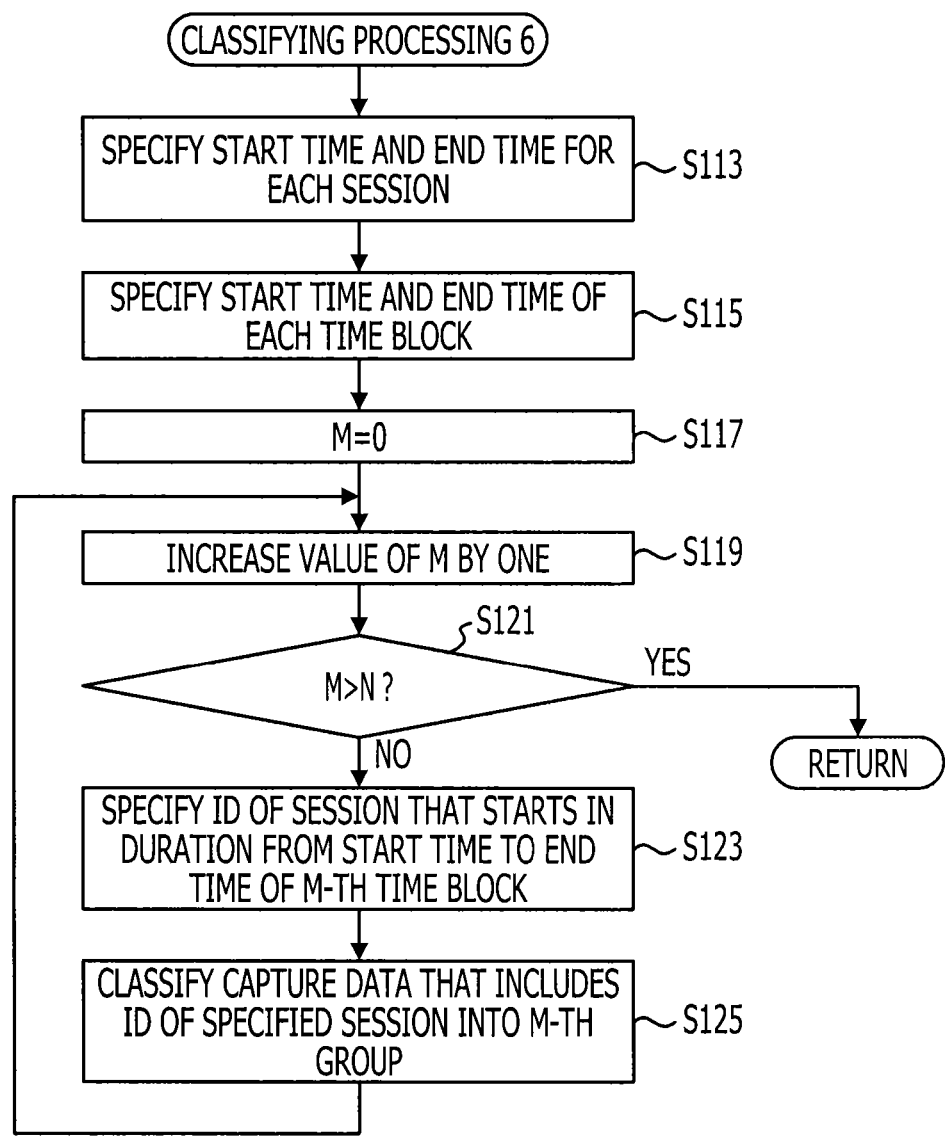
FIG. 17 illustrates a processing flow of calculating processing of a partition number N according to a sixth embodiment.

FIG. 17 illustrates a processing flow of the classifying processing according to the sixth embodiment. The processing from Operation S113 to Operation S121 is equivalent to the processing from Operation S91 to Operation S99, so that description thereof is omitted.

In Operation S121, if the variable M does not satisfy M>N (NO in Operation S121), the classifying unit 103 specifies the ID of the session that starts in the duration from the start time until the end time of the M-th time block (Operation S123). The classifying unit 103 classifies the capture data that includes the ID of the session specified in Operation S123 into the M-th group (Operation S125). The process goes back to Operation S119 to process the next variable M.

In Operation S121, if the variable M satisfies M>N (YES in Operation S121), the processing from the first time block to the N-th time block is completed, so that the process goes back to the original processing.

If the above-described processing is performed, the session from the time T_sta to the time T_end is thoroughly reproduced while the capture data for the uncompleted session in each of the groups is not included.

According to a seventh embodiment, a method for calculating a partition number N that satisfies an input verification time will be described below with reference to FIG. 18.

Figure 18:
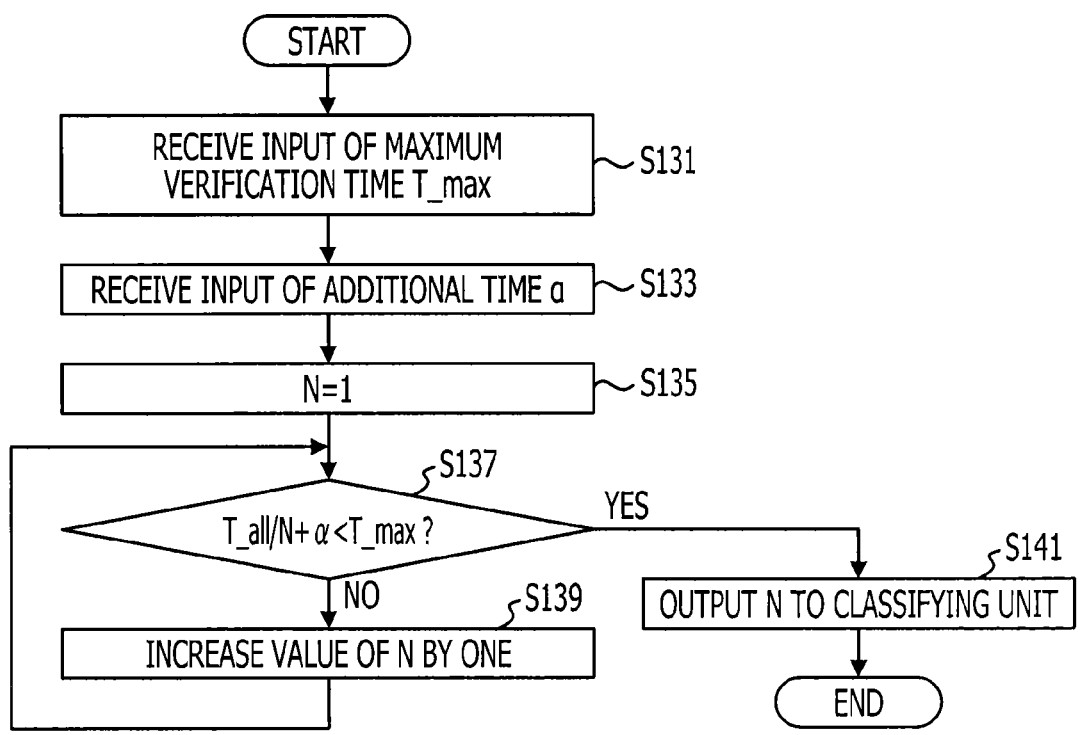
FIG. 18 illustrates a processing flow of calculating processing of the partition number N according to a seventh embodiment.

FIG. 18 illustrates a processing flowchart of calculating processing of the partition number N. The calculating unit 105 receives an input of the maximum verification time T_max from the user of the verification test apparatus 1 (Operation S131 in FIG. 18). The maximum verification time T_max is the maximum verification time that is permitted by the user of the verification test apparatus 1. The calculating unit 105 receives an input of an additional time α (Operation S133). The additional time α is a time of the maximum session that is estimated by the user.

The calculating unit 105 sets N to N=1 (Operation S135). The calculating unit 105 determines whether T_all/N+α<T_max is satisfied (Operation S137). That is, the calculating unit 105 determines whether the duration from the start time until the end time of the capture data assigned to each of the groups is shorter than the maximum verification time.

If T_all/N+α<T_max is not satisfied (NO in Operation S137), the calculating unit 105 increases the value of N by one (Operation S139). The process goes back to Operation S137. If T_all/N+α<T_max is satisfied (YES in Operation S137), the calculating unit 105 outputs the calculated value of N to the classifying unit 103 (Operation S141). The process ends.

By performing the above-described processing, the partition number N that satisfies the input maximum verification time is calculated. When the processing according to the seventh embodiment is performed, the additional time α is used as S_max according to the first and second embodiments.

According to an eighth embodiment, with reference to FIG. 19, a method for calculating the partition number N (that is, the number of verification system environments to be deployed) in a case where the partition number N is limited will be described below.

Figure 19:
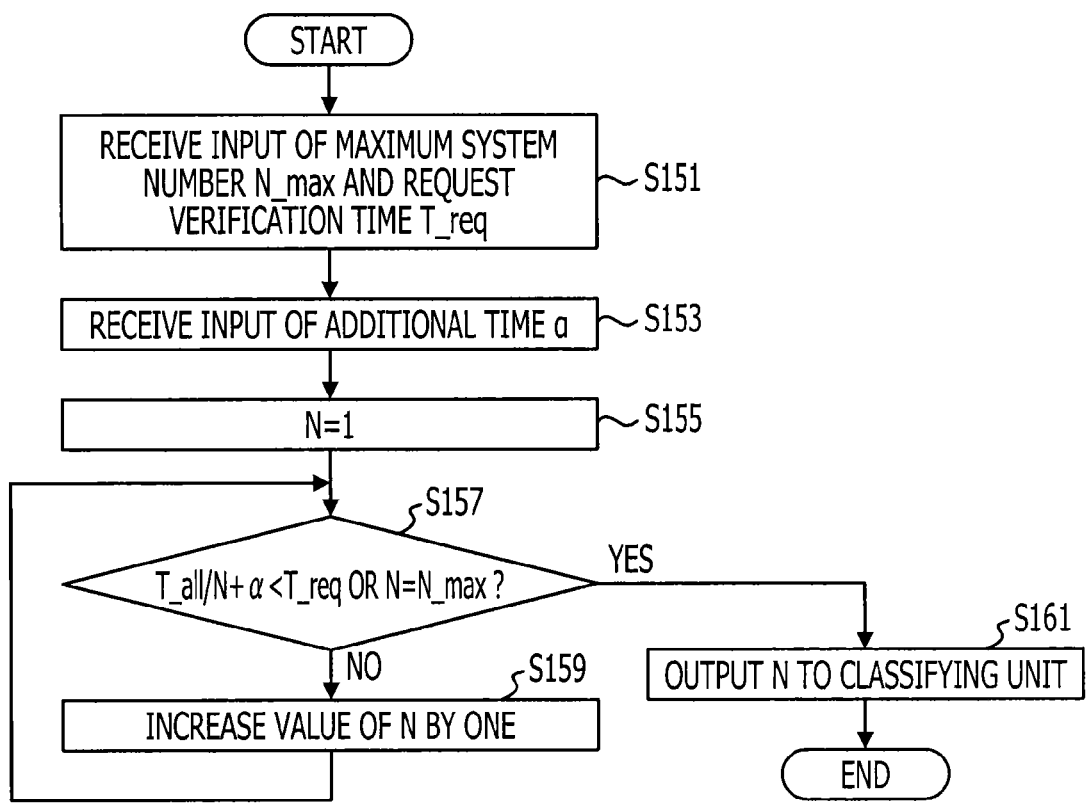
FIG. 19 illustrates a processing flow of calculating processing of the partition number N according to an eighth embodiment.

FIG. 19 illustrates a flowchart of calculating processing of the partition number N. The calculating unit 105 receives an input of a maximum system number N_max and a request verification time T_req from the user of the verification test apparatus 1 (Operation S151 in FIG. 19). The maximum system number N_max is the maximum value of the number of verification system environments that may be deployed. The request verification time T_req is a verification time desired by the user of the verification test apparatus 1. According to the eighth embodiment, N that satisfies the condition of the request verification time may not be calculated.

The calculating unit 105 receives an input of the additional time α (Operation S153). The additional time α is a time of the maximum session that is estimated by the user.

The calculating unit 105 sets N to N=1 (Operation S155). The calculating unit 105 determines whether T_all/N+α<T_req or N=N_max is satisfied (Operation S157).

If either T_all/N+α<T_req nor N=N_max is satisfied (NO in Operation S157), the calculating unit 105 increases the value of N by one (Operation S159). The process goes back to the processing in Operation S157. If T_all/N+α<T_req or N=N_max is satisfied (YES in Operation S157), the calculating unit 105 outputs the calculated value of N to the classifying unit 103 (Operation S161). The process ends.

By performing the above-described processing, the partition number N that satisfies the input request verification time is calculated as long as the upper limit of the maximum system number is not exceeded. If the processing according to the eighth embodiment is performed, the additional time α is used as S_max according to the first and second embodiment.

According to a ninth embodiment, with reference to FIG. 20, deformation examples of classifying processing according to the eighth embodiment will be described below.

Figure 20:
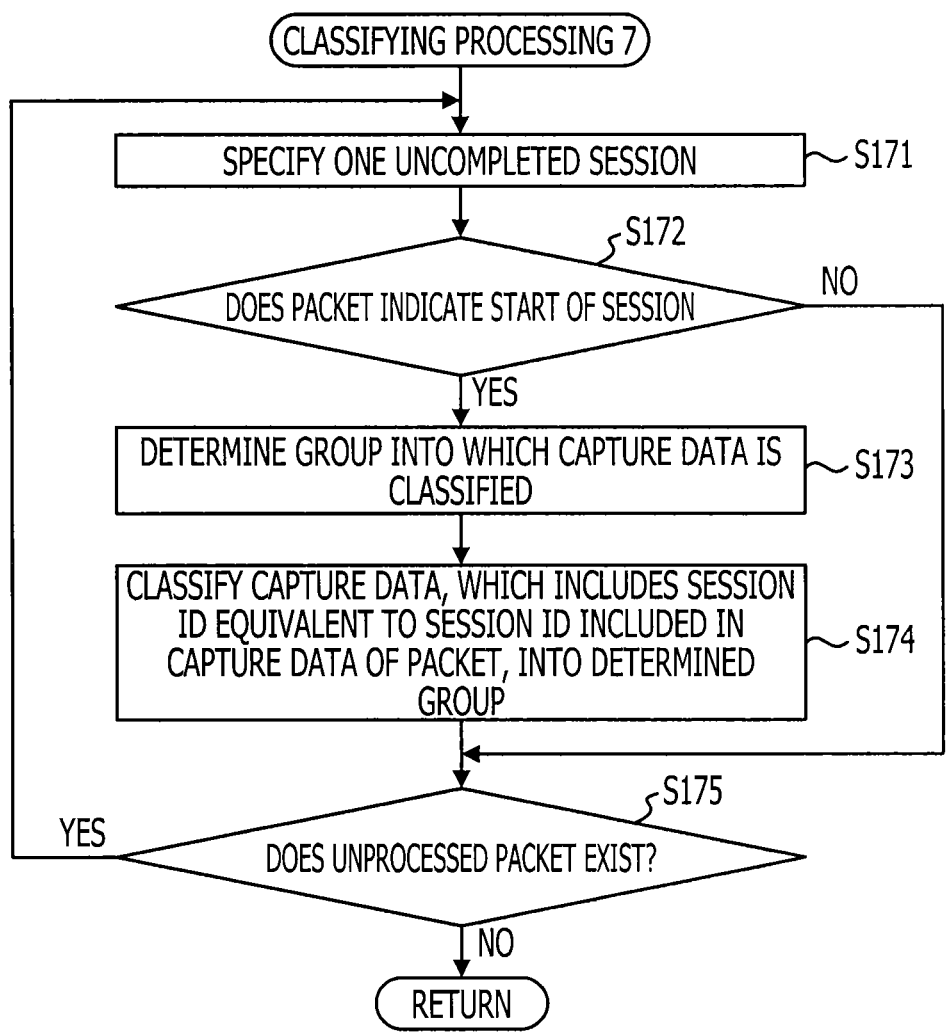
FIG. 20 illustrates a processing flow of classifying processing according to a ninth embodiment.

The classifying unit 103 specifies one unprocessed packet from the capture data that is read out in Operation S1 (Operation S171 in FIG. 20). In Operation S171, for example, the unprocessed packet is specified in order of earlier obtainment time of the packets.

The classifying unit 103 determines whether the packet specified in Operation S171 is a packet indicating the start of the session (Operation S173). In Operation S173, for example, the packet having the information of "Get/login" is the packet indicating the start of the session. The packet may be determined to be the packet indicating the end of the session instead of the start of the session.

If the packet is not the packet indicating the start of the session (NO in Operation S173), the process goes to the processing in Operation S177. If the packet is the packet indicating the start of the session (YES in Operation S173), the classifying unit 103 determines, among N groups (N is a natural number that is two or more), the group into which the capture data is classified (Operation S175). In Operation S175, the determination is made by round robin, for example. Further, the classifying unit 103 classifies the capture data, which includes the session ID equivalent to the session ID included in the capture data of the packet specified in Operation S171, into the group determined in Operation S175 (Operation S177).

The classifying unit 103 determines whether an unprocessed packet exists in the capture data read out in Operation S1 (Operation S179). If an unprocessed packet exists (YES in Operation S179), the process goes back to Operation S171 to process the next packet. If no unprocessed packet exists (NO in Operation S179), the process goes back to the original processing.

When the above-described processing is performed, the capture data is classified into a plurality of groups without the processing using the time blocks. Thus, the verification test is performed in parallel.

Although the embodiment of the present technique has been described, the present technique is not limited to the embodiment. For example, the configuration of the function block of the above-described verification test apparatus 1 does not typically correspond to the actual program module configuration.

The configuration of the tables described above is an example, and the configuration is not limited to the above-described example. As for the processing flow, the order of the processing may be switched unless the processing result is changed. The processing may be performed in parallel.

The practical use system environment 3 may be virtually realized inside the verification test apparatus 1 or virtually realized inside another apparatus other than the verification test apparatus 1. The verification system environment 107 may be virtually realized inside the apparatus other than the verification test apparatus 1, and the verification system environment 107 may be realized by a physics server or the like.

According to the first and second embodiments, the maximum session time S_max may be calculated by using the capture data stored in the practical use system data storage unit 102.

If the verification test is performed in parallel in the above-described manner, there is a possibility of a problem caused when relevant sessions are reproduced in different verification system environments even though the session is thoroughly reproduced. In this case, however, by performing the verification test of the capture data within a prescribed range from the part in which a problem is generated, it is confirmed, in a short period of time, whether the operation of the server actually has a problem.

Figure 21:
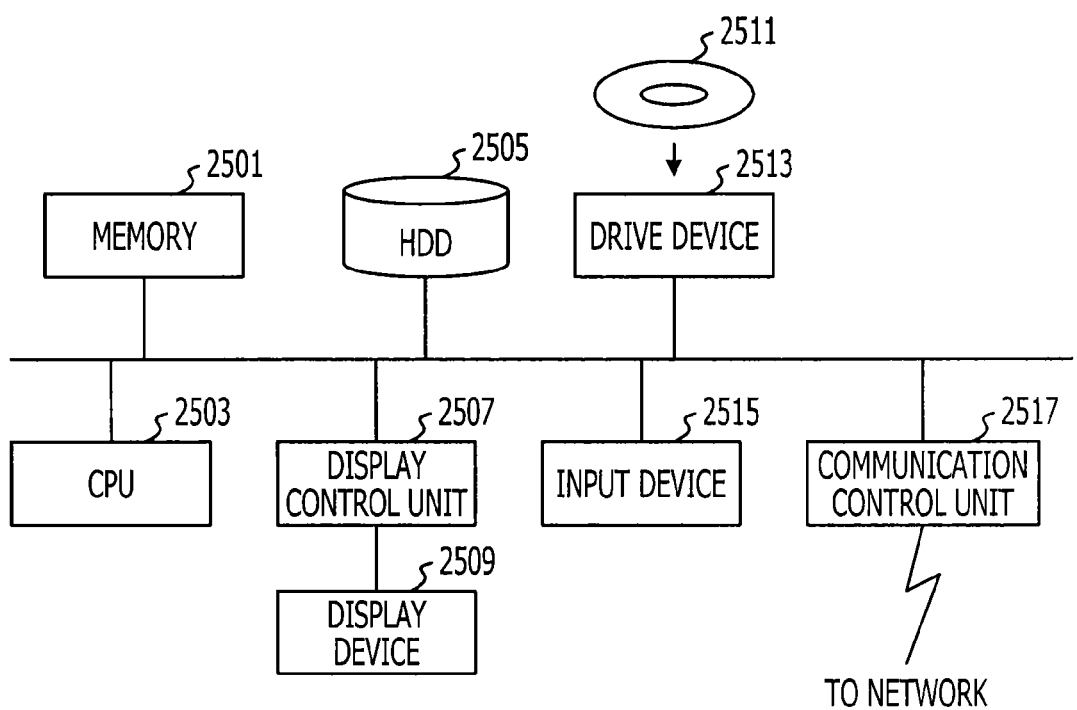
FIG. 21 illustrates a function block of a computer.

The above-described verification test apparatus 1, the client terminal 31, and the server 35 are a computer apparatus. As illustrated in FIG. 21, a memory 2501, a Central Processing Unit (CPU) 2503, a Hard Disk Drive (HDD) 2505, a display control device 2507 coupled to a display device 2509, a drive device 2513 and an input device 2515 for a removal disk 2511, and a communication control unit 2517 to be coupled to a network are coupled by a bus 2519. An Operating System (OS) and an application program used to perform the processing according to the ninth embodiment are stored in the HDD 2505 and are then read out by the memory 2501 from the HDD 2505 to be performed by the CPU 2503. According to the processing contents of the application program, the CPU 2503 controls the display control unit 2507, the communication control unit 2517, and the drive device 2513 to perform a prescribed operation. The data that is being processed is stored mainly in the memory 2501. The data that is being processed may be stored in the HDD 2505. According to the embodiments of the present technique, the application program used to perform the above-described processing is stored in the computer-readable removable disk 2511 to be distributed and is then installed into the HDD 2505 from the drive device 2513. The application program may be installed in the HDD 2505 though a network such as the Internet and the communication control unit 2517. When hardware such as the above-described CPU 2503 and memory 2501, the OS, the program such as the application program, and the like are organically cooperated with each other, the above-described computer device realizes the above-described functions.

The embodiments of the present technique are compiled as described below.

The information processing method according to the embodiments includes (A) processing for reading out, from the data storage unit that stores a packet in association with an obtainment time of the packet, the packet obtained in the duration from a first time until a second time and the obtainment time of the packet, (B) processing for classifying, based on the session information included in the read out packet and on the obtainment time of the packet, the packet, obtained in the duration from the first time until the second time, in such a way that after the duration from the first time until the second time is divided into N (N is a natural number that is two or more) time blocks, the packet included in the session that ends in the m-th (m is a natural number satisfying 1<=m<=N) time block is classified into the m-th group or that the packet included in the session that starts in the m-th time block is classified into the m-th group, and (C) processing for outputting the packets classified into N groups to a corresponding machine among N machines performing the verification test for request or response by the packets.

In a case where the duration of the verification test by the parallel processing is shortened, an uncompleted session is prevented from being generated, and the session from the first time until the second time is conscientiously reproduced. Thus, the appropriate verification test is performed.

The session information included in the above-described packet may include the ID of a session and the data used to specify the start or the end of the session. The above-described classifying processing may include (b1) processing for specifying, by using the data used to specify the start or the end of the session, to specify the ID of the session included in the data of the specified packet, the packet, which indicates the end of the session or the packet indicating the start of the session obtained in the m-th time block and (b2) processing for classifying the data of the packet that includes the ID of the specified session into the m-th group. In this manner, the classification is properly performed even if the length of the session is not obtained in advance.

The above-described classifying processing may include (b3) processing for classifying the data of the packet obtained in the first time block into the first group and classifying the data of the packet, obtained in the duration from the time T as the maximum session time before from the start time of a $1^{st}$ (1 is a natural number satisfying 2<=1<=N) time block until the end time of the $1^{st}$ time block, into the 1st group or classifying the packet obtained in the duration from the start time of the k-th (k is a natural number satisfying 1<=k<=(N−1)) time block until the time T later the end time of the k-th time block into a k-th group and classifying the data of the packet obtained in the N-th time block into the N-th group. In this manner, although the data of the packet included in the session that ended (or started) in the m-th time block may be classified into a plurality of groups, the data of the packet from the start until the end of the session may be included in the m-th group. Due to this, the session from the first time until the second time is thoroughly reproduced.

The above-described information processing method may include (D) processing, when the input of the verification time is received, for calculating N as the minimum value among J (J is a natural number that is two or more) satisfying the condition in which the time, obtained by adding T to the time obtained by dividing the duration from the first time until the second time by J, is shorter than the verification time. According to the above-described classifying processing, the duration from the first time until the second time may be divided into N time blocks with similar lengths. In this manner, the verification test is completed within the verification time.

The above-described information processing method may further include (E) processing for calculating, when an input of the verification time and the maximum value of the number of machines is input, N as the smaller value among the minimum value among J (J is a natural number that is two or more) satisfying the condition in which the time, obtained by adding T to the time obtained by dividing the duration from the first time until the second time by J, is shorter than the verification time and the maximum value of the number of the machines. According to the above-described classifying processing, the duration from the first time until the second time may be divided into N time blocks with similar lengths. In this manner, the verification test is completed within the verification time as long as the number of machines is not larger than the maximum value.

A program used to make a computer perform the processing by the above-described method may be created. The program is stored in a computer-readable memory medium or a memory device such as, for example, a flexible disk, a CD-ROM, an optical magnetic disk, a semiconductor memory, and a hard disk. An intermediate processing result is temporally stored in a memory device such as a main memory.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process, wherein the process includes:
    defining periods which are included in a duration of communications of packets each of which includes session information, each of the periods having length equal to or longer than a specific session duration of sessions included in the communications;
    grouping the packets in accordance with the periods based on the session information, so that each of the packets having same session information is grouped in one of the periods;
    distributing the packets to machines based on the grouping; and
    performing verification tests based on the packets distributed to the machines by each of the machines.

2. The non-transitory computer-readable recording medium according to claim 1,
    wherein the packets are distributed based on the longest session duration in the session durations in the distributing.

3. The non-transitory computer-readable recording medium according to claim 2,
    wherein packets, which are communicated in a duration that includes a division duration being set based on a division of a given duration into the number of the machines and the longest session duration, are verified by one machine of the machines in the performing.

4. The non-transitory computer-readable recording medium according to claim 1,
    wherein the session durations are defined based on a duration from a start to an end of sessions which included in the communication of the packets.

5. A non-transitory computer-readable recording medium having stored therein a program for causing a computer to execute a process including:
    distributing packets to machines based on session durations according to a communication of the packets in a given duration; and
    performing verification tests based on the packets distributed to the machines by each of the machines, wherein the process includes:
        capturing the packets and obtaining capture times of the packets;
        dividing the given duration into N (N is a natural number that is two or more) time blocks; and
        classifying, based on the capture times, the captured packets into each of the N time blocks in such a way that a first packet included in a first session duration that ends in an m-th (m is a natural number satisfying $1<=m<=N$) time block is classified into an m-th group or that a second packet included in a second duration that starts in n-th (n is a natural number satisfying $1<=n<=N$) is classified into an n-th group,
        wherein each of the classified packets is distributed to each of the machines in the distributing.

6. The non-transitory computer-readable recording medium according to claim 5,
    wherein each of the packets includes an ID of the session duration and a time information of a start or an end of the session duration, and
    wherein, in the classifying, the ID of the session duration is classified into the any one of N time blocks based on the time information.

7. The non-transitory computer-readable recording medium according to claim 5,
    wherein processes are performed in the classifying, the processes including:
    classifying packet captured in a first time block among the N time blocks into a first group; and
    classifying the packet captured in a duration from a time T as a maximum session time before the start time of an L-th (L is a natural number satisfying $2<=L<=N$) time block until the end time of the L-th time block or classifying the packet captured in the duration from the start time of a K-th (K is a natural number satisfying $1<=K<=(N-1)$) time block until the time T later the end time of the K-th time block into a K-th group.

8. The non-transitory computer-readable recording medium according to claim 7,
wherein the process includes:
when an input of a verification time is received, calculating N as a minimum value among J (J is a natural number that is two or more) satisfying the condition in which a time, obtained by adding the T to a time obtained by dividing the given duration by J, is shorter than the verification time,
wherein the given duration is divided into the N time blocks with similar lengths where the N is the minimum value.

9. The non-transitory computer-readable recording medium according to claim 7, wherein the process includes:
when the input of a verification time and the maximum value of the number of machines is received, calculating N as a smaller value among the minimum value J satisfying the condition in which the time, obtained by adding the T to the time obtained by dividing the given duration by J, is shorter than the verification time and the maximum value of the number of machines,
wherein the given duration is divided into the N time blocks with similar lengths where the N is the minimum value.

10. An information processing method comprising:
defining, using a computer, periods which are included in a duration of communications of packets each of which includes session information, each of the periods having length equal to or longer than a specific session duration of sessions included in the communications;
grouping, using the computer, the packets in accordance with the periods based on the session information, so that each of the packets having same session information is grouped in one of the periods;
distributing, using the computer, the packets to machines based on the groupings; and
performing verification tests based on the packets distributed to the machines by each of the machines.

11. The information processing method according to claim 10,
wherein the packets are distributed based on the longest session duration in the session durations in the distributing.

12. The information processing method according to claim 11,
wherein packets, which are communicated in a duration that includes a division duration being set based on a division of a given duration into the number of the machines and the longest session duration, are verified by one machine of the machines in the performing.

13. The information processing method according to claim 10,
wherein the session durations are defined based on a duration from a start to an end of given communications of the communication of the packets.

14. The information processing method according to claim 10 comprising:
capturing the packets and obtaining capture times of the packets;
dividing a given duration N (N is a natural number that is two or more) time blocks; and
classifying, based on the capture times, the captured packets into each of the N time blocks in such a way that a first packet included in a first session duration that ends in an m-th (m is a natural number satisfying 1<=m<=N) time block is classified into an m-th group or that a second packet included in a second duration that starts in n-th (n is a natural number satisfying 1<=n<=N) is classified into an n-th group,
wherein each of the classified packets is distributed to each of the machines in the distributing.

15. An information processing device comprising:
a memory which stores a program; and
a processor which executes, based on the program, a procedure comprising:
defining periods which are included in a duration of communications of packets each of which includes session information, each of the periods having length equal to or longer than a specific session duration of sessions included in the communications;
grouping the packets in accordance with the periods based on the session information, so that each of the packets having same session information is grouped in one of the periods;
distributing the packets to machines based on the grouping; and
performing verification tests based on the packets distributed to the machines by each of the machines.

16. The information processing device according to claim 15,
wherein the packets are distributed based on the longest session duration in the session durations in the distributing.

17. The information processing device according to claim 16,
wherein packets, which are communicated in a duration that includes a division duration being set based on a division of a given duration into the number of the machines and the longest session duration, are verified by one machine of the machines in the performing.

18. The information processing device according to claim 15,
wherein the session durations are defined based on a duration from a start to an end of given communications of the communication of the packets.

19. An information processing device comprising:
a memory which stores a program; and
a processor which executes, based on the program, a procedure comprising:
distributing packets to machines based on session durations according to a communication of the packets in a given duration; and
performing verification tests based on the packets distributed to the machines by each of the machines, wherein
the procedure includes:
capturing the packets and obtaining capture times of the packets;
dividing the given duration N (N is a natural number that is two or more) time blocks; and
classifying, based on the capture times, the captured packets into each of the N time blocks in such a way that a first packet included in a first session duration that ends in an m-th (m is a natural number satisfying 1<=m<=N) time block is classified into an m-th group or that a second packet included in a second duration that starts in n-th (n is a natural number satisfying 1<=n<=N) is classified into an n-th group,
wherein each of the classified packets is distributed to each of the machines in the distributing.

20. The information processing device according to claim 19,
- wherein each of the packets includes an ID of the session duration and a time information of a start or an end of the session duration, and
- wherein, in the classifying, the ID of the session duration is classified into the any one of N time blocks based on the time information.

* * * * *